July 29, 1958  N. GUIDA  2,844,899
DISPLAY DEVICE
Filed April 7, 1954  2 Sheets-Sheet 1
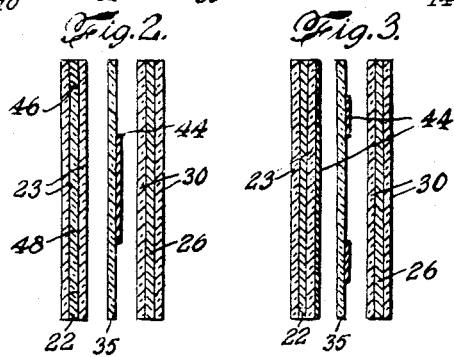
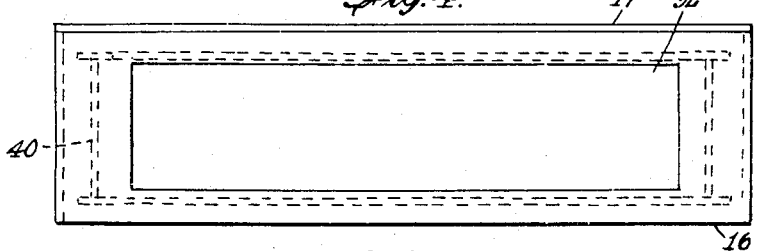
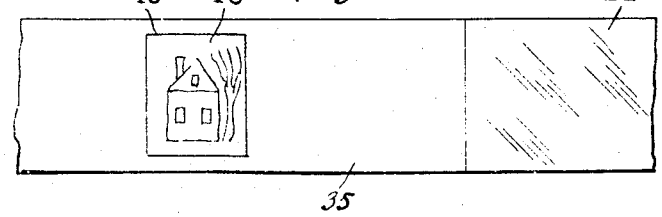

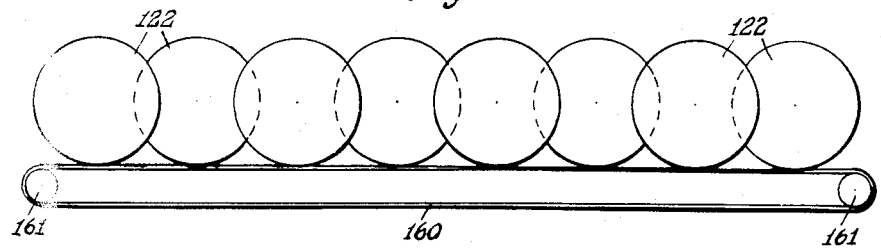
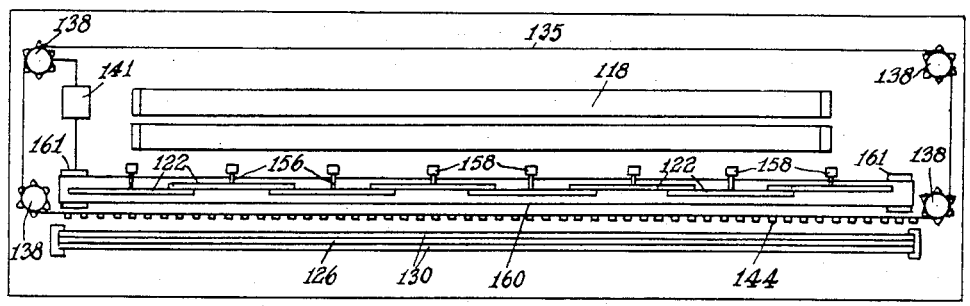
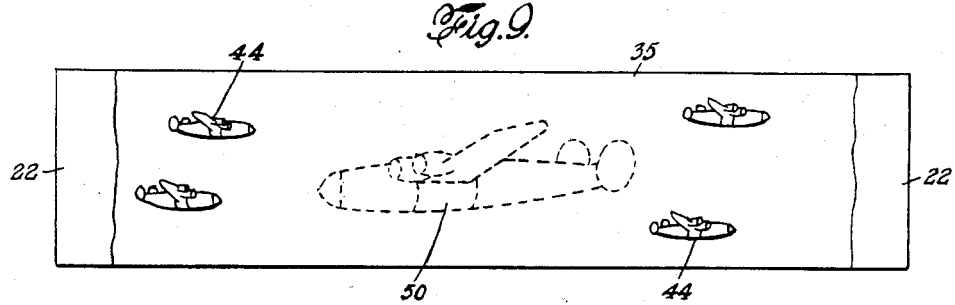

United States Patent Office 2,844,899
Patented July 29, 1958

2,844,899

DISPLAY DEVICE

Nicholas Guida, Great Neck, N. Y., assignor, by mesne assignments, to Visa-Matic Corporation, New York, N. Y., a corporation of New York Application April 7, 1954, Serial No. 421,530

2 Claims. (Cl. 40—130)

This invention relates to a display device and is more particularly concerned with an animated portable display device wherein novel visual effects are obtained.

Display devices which are commonly used for advertising purposes in store windows, on counters, and the like are intended to attract passers-by and to induce them to look at and/or read the advertising message carried by the device. Various display devices of this nature have been heretofore proposed and have been used for various purposes. Known display devices of the portable type, however, are generally limited in their application and are not adapted to produce a variety of different effects. In others, special lighting or multiple lighting sources are necessary in order to obtain the desired effect.

It is the principal object of the present invention to provide a display device of novel construction adapted to produce novel visual effects.

It is another object of the invention to provide a display device of the character indicated which requires only a single light source and permits the production of varied lighting effects without need for special lighting means.

It is a further object of the invention to provide a display device adapted to provide a plurality of different visual effects and to provide these effects in a particularly effective manner.

It is another object of the invention to provide a display device of this nature wherein a continuous illusion of motion and continually varying light is obtainable.

It is a still further object of the invention to provide a display device which makes possible the production of novel combinations of photograph images and letters, numbers, or other indicia.

In accordance with the invention, I provide a display device of the character above-mentioned which is composed of an optical system which comprises, for use in combination with a source of light, a light polarizing body positioned on one side of the light, a second light polarizing body parallel to and spaced from the first light polarizing body on the side away from the source of light, double refracting or so-called bi-refringent material overlying selected areas of one of the light polarizing bodies, a band providing a transparent supporting surface disposed for movement between the two light polarizing bodies, and double refracting (bi-refringent) material overlying selected areas of the transparent supporting surface. The two polarizing bodies have their polarizing axes arranged for minimum light transmission and the axes of the bi-refringent material overlying one of the light polarizing bodies and overlying the transparent supporting surface are positioned in the relationship to give maximum light transmission when viewed from the front of the light polarizing body most remote from the light source.

In accordance with one embodiment of the invention the transparent band is constructed as a continuous belt and is arranged for continuous movement through the space between the two light polarizing bodies, thereby providing novel, highly-attractive optical effects.

In another embodiment of the invention, a portion of one of the light polarizing bodies is replaced by a photographic transparency to provide further attractive optical effects.

It is a feature of the invention that different areas of one or both light polarizing bodies may be overlain by bi-refringent material and that varying designs may be provided by the positioning of the bi-refringent material on the moving transparent supporting surface.

It is a further feature of the invention that both lettering and photographic representations can be interrelated in a pleasing and attractive manner with continuous relative movement.

It is another feature of the invention that, by reason of the presence of the bi-refringent material on selected areas of the light polarizing bodies and the moving transparent band, there will be contrasting lighting effects which will continuously vary as the transparent band passes between the light polarizing bodies.

Other objects and features of the invention will be readily apparent from the following detailed description of illustrative embodiments thereof and from the accompanying drawings, wherein, Fig. 1 is a plan view of a display device embodying features of the present invention, the top of the casing containing the various elements of the device being removed;

Fig. 2 is a transverse sectional view of the device taken approximately along the line 2—2 of Fig. 1;

Fig. 3 is a similar view of another portion of the device, taken approximately along the line 3—3;

Fig. 4 is a front elevation of the display device of the invention shown in Fig. 1;

Fig. 5 is an elevational view of the moving transparent band shown in Fig. 1 as seen when viewed along the line 5—5;

Fig. 6 is an elevational view of the rear assembly containing light polarizing material, as seen when viewed along the line 6—6;

Fig. 7 is a front elevational view of the assembly of light polarizing assembly of another embodiment of the invention;

Fig. 8 is a top plan view of an embodiment of the invention comprising the light polarizing assembly illustrated in Fig. 7; and Fig. 9 is an elevational view of the moving transparent band and the light polarizing material disposed behind it in another embodiment of the invention.

Referring to the drawings, and more particularly to Figs. 1 to 6, the reference numeral 10 designates generally the display unit illustrated which is suitably enclosed by a casing 12 having a front wall 14, side walls 15, a bottom 16 and a top 17. At the rear of the casing is a light source 18 which may be a conventional fluorescent lamp of any convenient power, e. g. 40 watts. Behind the lamp 18 there is advantageously, although not necessarily, placed a reflector 20 for directing the rearward rays from the bulb toward the front of the casing. In front of the light source 18 is positioned a polarizing element 22 suitably held between two sheets of glass 23 in a frame 24. The light polarizing element 22 may comprise a sheet of a light polarizing material such, for example, as a sheet of material sold under the name Polaroid, and suitably formed for example, of the material described in U. S. Patent 1,918,848. This material may comprise a set suspending medium with a plurality of polarizing bodies immovably embedded in it with their polarizing axes oriented to be in substantial parallelism. The light polarizing element 22 may also be in the form of a transparent carrier provided with a coating of optically-oriented crystalline light polarizing material such as the coating described in U. S. Patent 2,087,795. A second light polarizing element 26 is spaced from element 22 and substantially parallel thereto and is suitably mounted, as in a frame 28, between two sheets of glass 30. The two light polarizing elements 22 and 26 have their polarizing axes arranged at the point of minimum light transmission so that they appear substantially black when viewed through the opening 32 provided in the front wall 14, which may be suitably closed by a sheet of glass or the like.

Disposed for movement in the space between the two light polarizing elements is belt or band 35 formed from clear, transparent material which does not affect the transmission of the light from the light source 18, such as celluloid or other like material commonly used in the manufacture of motion picture film. Like motion picture film, the band 35 is suitably provided with perforations 36 along its longitudinal edges and motion is imparted to the band 35 by means of sprockets or the like 38 which are suitably journalled on shafts 40 in the casing of the unit 10, as shown in Fig. 1. One of the sprockets is suitably driven, as by the motor 41, by means of a pulley, worm gear, or other convenient mechanical connection. The remaining sprockets 38 are freely rotatable and serve primarily to guide and support the band 35 during rotation.

To provide the novel visual effects obtainable in accordance with the invention, selected areas of the band 35 are overlain by strips of bi-refringent material 44 to define letters, figures, or outlines of any desired nature. As shown in Fig. 5, words can be readily spelled out and by reason of the rotation of the band 35 the words continuously disappear and then later reappear. The strips of bi-refringent material are placed on the band 35 with their axes positioned in the relationship to give maximum light transmission. The proper position of the bi-refringent material can be readily determined by holding it between the two light polarizing elements, and it is then suitably cut to provide the desired letters or designs. The cutting of the material may be effected either before or after it is secured to the band 35. Particularly suitable as bi-refringent (double-refracting) material is regenerated cellulose, known commercially as "cellophane," and for ease of application there is advantageously used a cellophane strip coated on one side with a pressure sensitive adhesive by means of which the strip may be applied to the surface of band 35. While cellophane is the preferred bi-refringent material it will be apparent that other materials having like action upon plane polarized light may also be employed, for example, mica.

Particularly attractive results are obtained when portions of one or both of the light polarizing elements 22 and 26 are also overlain by bi-refringent material 44. As shown in Fig. 6, the right-hand portion of the rear polarizing element 22 is covered by a sheet of bi-refringent material, such as a strip of cellophane, which has its axis positioned in such manner that it transmits maximum light. In the embodiment illustrated, the bi-refringent material 44 is applied to the outer surface of one of the glass plates 23 between which the polarizing element 22 is sandwiched; it will be evident, however, that if desired the bi-refringent sheet 44 may also be placed between the glass sheets 23 and thus directly overlie the polarizing element 22. Similarly, if desired, the sheet 44 may be in the same manner placed in association with the outer polarizing element 26. With the various elements of the unit 10 thus arranged, the band 35 being set in motion, the design formed by the bi-refringent material 44 on the moving band 35, e. g. the word Advertise, will appear black against a white background as it appears at the right side of the opening 32 and moves toward the left. When, however, the design on the moving band reaches the end of the area defined by the bi-refringent material overlying the light polarizing element, the design enters the portion of the area visible through the opening 32 which is free from bi-refringent material, and as it does so it appears white against a black background, this sudden reversal of color creating a startling effect and serving to attract the attention of passersby.

Additional optical effects are obtainable when a portion of one of the light polarizing elements is cut out and replaced by a photographic transparency. Referring to Figs. 2 and 6, for example, a rectangular aperture 46 is cut in the polarizing element 22 and in this aperture is placed a photographic transparency 48. The transparency 48, such as a colored or black and white photographic transparency, is suitably formed by any of the well-known processes commonly employed and carries an image to be placed in view through the front opening 32. For most purposes the standard transparency may be used directly. It is contemplated that the unit 10, in addition to its use as a window or counter display or the like, may also be used as a subject to be recorded on motion picture film or to be transmitted by television. When the image is to be received by a television camera, it may be necessary to retouch the transparency by recoloring any portions which appear too dark when transmitted by television. It is well known that certain colors are transmitted as dark tones by television and that it is desirable to change these colors to those which are transmitted in lighter tones if optimum clarity and definition is to be obtained.

Thus when the unit 10 is in operation, the image on the transparency will be visible and the words or other design or indicia on the moving band 35 will pass before the eyes of the viewers, and as the design on the band passes through the area occupied by the transparency it will disappear from view but will reappear as soon as this area has been passed.

It will be readily apparent that various other novel and attractive effects may be obtained by means of the above described system which comprises the unit 10. For example, referring to Fig. 9, one of the light polarizing elements may have a design cut from it, such as the design 50 in the form of a large plane shown in this figure. The design formed by the bi-refringent strips 44 on the moving band 35 gives a third dimensional effect by appearing to pass behind the cut-out design in the light polarizing element. Thus a variety of pleasing effects can be obtained by varying the designs formed by the bi-refringent material on the moving band and by varying the shape of the cutout portion of the light polarizing material. If it is desired to provide an image in detail in the cut-out portion, this can be filled in with a transparency as in the previously-described embodiment.

It will be understood that it is not necessary that the band 35 move always in the same direction. It may move either from right to left or from left to right and may even move back and forth with a reciprocating or pendulum-like motion. Reciprocating motion of this character can easily be brought about by using a reversible motor 41 and providing its feed circuit with an automatically reversing switch in any conventional manner.

In another embodiment of the invention additional optical effects can be obtained by replacing the rear light polarizing element by a plurality of aligned rotating polarizing elements. Thus, as shown in Figs. 7 and 8, wherein parts corresponding to those shown in Figs. 1 to 6 have been given like reference numerals to which 100 has been added, the polarizing element 22 of Fig. 1 is replaced by discs 122 each of which is formed from a light polarizing element and is mounted on a shaft 156 journalled in a bearing support 158. The discs 122 are rotated by means of an endless belt 160 which engages their peripheries and is carried by rollers 161, one of which is suitably driven from the motor 141. As shown in Fig. 7, the discs 122 are arranged in overlapping relationship so as to present a substantially continuous background for the moving band 135 carried by the sprockets 138. Where variegated color effects are desired, these can readily be obtained by applying the bi-refringent material 144 to the moving band 135 haphazardly rather than in the optically aligned positions referred to above. Thus, the band 135 may be coated with any transparent adhesive and small pieces of the bi-refringent material 144 sprayed or blown on it. When the thus-treated band moves in front of the rotating discs the result is continuously moving and changing colors. Obviously, letters, numbers or other indicia or designs may also be carried by the band 135.

It will be apparent that various changes and modifications may be made in the embodiments above described and shown in the drawings without departing from the scope of the invention as defined in the appended claims. For example, if the light polarizing elements are self-sustaining sheets they may be directly mounted in the frames without being sandwiched between glass plates. Similarly, driving means other than those illustrated may be employed, for example, a frictional driving means, and the bi-refringent material may be arranged relatively to the light polarizing elements to form designs or indicia other than those specifically mentioned. In the drawings the spacing between the polarizing material and the band carrying the bi-refringent material has been exaggerated in the interests of clarity and, in practice, it is not necessary to have this spacing, and the band and the polarizing material may be more closely associated so long as there is space to permit a free relative movement of the band. It will be understood that the transparent band is non-polarizing and that the adhesive employed in securing the bi-refringent material to the band, or to the polarizing sheets, is similarly isotropic, such as liquid cellulose acetate or other adhesives commonly employed in making pressure-sensitive cellulose tape. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

This application is a continuation-in-part of my co-pending application, Serial No. 373,833, filed August 12, 1953.

What I claim and desire to secure by Letters Patent is:

1. An advertising display device comprising in combination with a source of light, a pair of parallel sheets of polarizing material affixed on one side of said source with the polarizing axes of said sheets at right angles to one another, the adjacent flat sides of said sheets being spaced from one another, an endless band of flexible transparent material, means forming a trackway for said band with said band passing around a closed circuit substantially parallel between said sheets and around the opposite side of said source, means for moving said band around said circuit, bi-refringent material constituting advertising indicia on said band, said indicia moving with said band along a path between said sheets, and other bi-refringent material disposed over a portion of the said adjacent flat sides of one of said sheets for transmitting diffused light across only a portion of said path.

2. The combination claimed in claim 1, said other bi-refringent material being disposed over the sheet nearest the source of light.

References Cited in the file of this patent

UNITED STATES PATENTS

| | | |
|---|---|---|
| 1,837,894 | Bosche | Dec. 22, 1931 |
| 2,146,962 | Land | Feb. 14, 1939 |
| 2,158,129 | Land | May 16, 1939 |
| 2,169,022 | Chubb | Aug. 8, 1939 |
| 2,171,462 | Trollope et al. | Aug. 29, 1939 |
| 2,174,270 | Land | Sept. 26, 1939 |
| 2,232,815 | Van Ausdell | Feb. 25, 1941 |
| 2,393,970 | Burchell et al. | Feb. 5, 1946 |
| 2,419,216 | Hotchner | Apr. 22, 1947 |
| 2,535,781 | Burchell | Dec. 26, 1950 |

FOREIGN PATENTS

| | | |
|---|---|---|
| 906,683 | France | May 28, 1945 |